United States Patent
Aher et al.

(10) Patent No.: US 12,437,763 B2
(45) Date of Patent: Oct. 7, 2025

(54) METHODS TO EMPLOY CONCATENATION IN ASR SERVICE USAGE BASED ON SPEECH-TO-TEXT COST

(71) Applicant: Adeia Guides Inc., San Jose, CA (US)

(72) Inventors: Ankur Anil Aher, Maharashtra (IN); Jeffry Copps Robert Jose, Tamil Nadu (IN)

(73) Assignee: Adeia Guides Inc., San Jose, CA (US)

( * ) Notice: Subject to any disclaimer, the term of this patent is extended or adjusted under 35 U.S.C. 154(b) by 119 days.

(21) Appl. No.: 17/623,372

(22) PCT Filed: Dec. 20, 2019

(86) PCT No.: PCT/IB2019/001348
§ 371 (c)(1),
(2) Date: Dec. 28, 2021

(87) PCT Pub. No.: WO2021/123853
PCT Pub. Date: Jun. 24, 2021

(65) Prior Publication Data
US 2022/0366912 A1    Nov. 17, 2022

(51) Int. Cl.
*G10L 15/26* (2006.01)
*G06F 16/60* (2019.01)
(Continued)

(52) U.S. Cl.
CPC .............. *G10L 15/26* (2013.01); *G10L 15/04* (2013.01); *G10L 15/22* (2013.01); *G10L 15/30* (2013.01)

(58) Field of Classification Search
CPC ....... G10L 13/033; G10L 15/32; G06F 16/60; G06Q 10/10
(Continued)

(56) References Cited

U.S. PATENT DOCUMENTS 6,157,911 A    12/2000  Kuroda
6,691,089 B1    2/2004  Su et al.
(Continued)

FOREIGN PATENT DOCUMENTS

WO    2016/169329 A1    10/2016

OTHER PUBLICATIONS

Hain et al., "Segment Generation and Clustering in the HTK Broadcast News Transcription System," Proc. Darpa BNTUS, 133-137 (1998) (5 pages).

(Continued)

*Primary Examiner* — Farzad Kazeminezhad
(74) *Attorney, Agent, or Firm* — HALEY GUILIANO LLP

(57) ABSTRACT

Systems and methods for processing audio streams are disclosed herein. In a disclosed method, N number of audio streams is received from an independent source, each audio stream includes speech content. A set of the N audio streams is concatenated to generate a concatenated audio stream. Based on the N received audio streams or the set of audio streams, N−1 or one less that the total number of audio streams in the set of audio stream separators, respectively, are generated. An audio stream separator is inserted between every two adjacent audio streams of the concatenated audio stream to generate a single audio stream payload. The single audio stream payload is transmitted for transcription of the audio stream speech content to text content and in response to transmitting the payload, a text file is received including text content corresponding to the audio streams delineated by the audio stream separators.

20 Claims, 7 Drawing Sheets

(51) Int. Cl.
 *G06Q 10/10* (2023.01)
 *G10L 13/033* (2013.01)
 *G10L 15/04* (2013.01)
 *G10L 15/22* (2006.01)
 *G10L 15/30* (2013.01)
 *G10L 15/32* (2013.01)

(58) Field of Classification Search
 USPC ........................................................ 704/235
 See application file for complete search history.

(56) References Cited

U.S. PATENT DOCUMENTS

| | | | | |
|---|---|---|---|---|
| 10,133,538 B2* | 11/2018 | McLaren | ................ | G06F 16/60 |
| 10,176,809 B1 | 1/2019 | Piérard | | |
| 11,017,778 B1* | 5/2021 | Thomson | .......... | H04M 3/42382 |
| 11,545,134 B1* | 1/2023 | Federico | ............... | G10L 13/033 |
| 11,790,916 B2* | 10/2023 | Agarwal | ................. | G10L 15/22 |
| | | | | 704/235 |
| 2007/0077040 A1 | 4/2007 | Nozomu | | |
| 2012/0072211 A1 | 3/2012 | Edgington et al. | | |
| 2013/0166279 A1 | 6/2013 | Dines et al. | | |
| 2017/0053643 A1 | 2/2017 | Ben-David | | |
| 2019/0341052 A1 | 11/2019 | Allibhai | | |
| 2021/0183374 A1 | 6/2021 | Thomson | | |
| 2022/0375465 A1 | 11/2022 | Aher et al. | | |

OTHER PUBLICATIONS

PCT International Search Report and Written Opinion for International Application No. PCT/IB2019/001349, dated Sep. 16, 2020 (16 Pages).
PCT International Search Report and Written Opinion for International Application No. PCT/IB2019/001348, dated Sep. 8, 2020 (14 Pages).

* cited by examiner

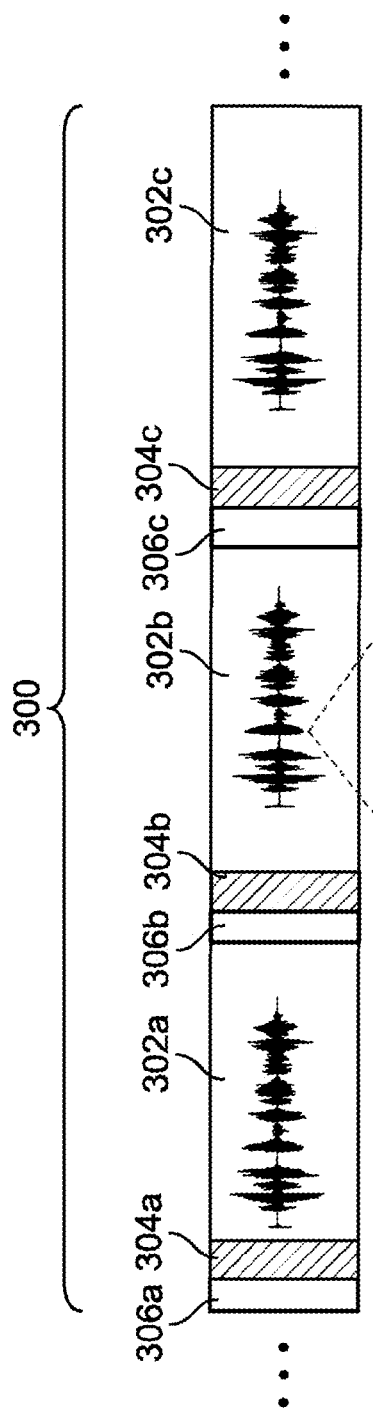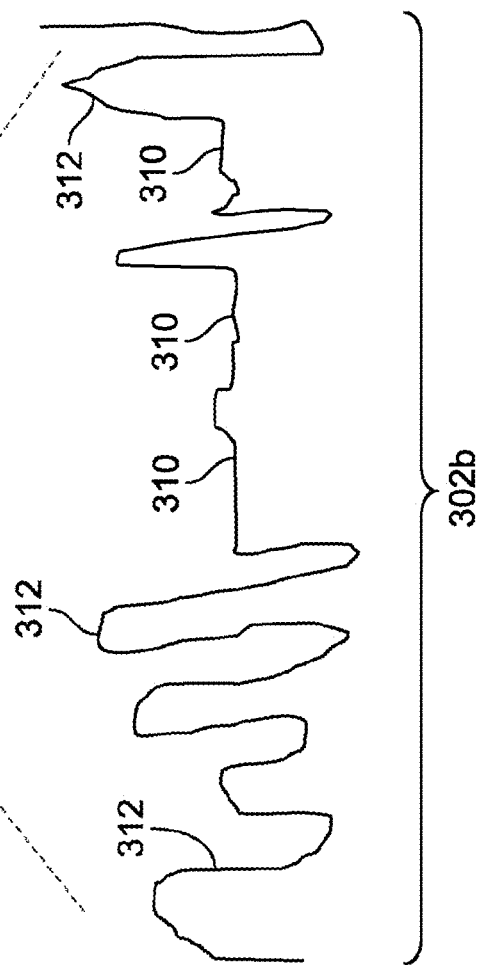

METHODS TO EMPLOY CONCATENATION IN ASR SERVICE USAGE BASED ON SPEECH-TO-TEXT COST

CROSS-REFERENCE TO RELATED APPLICATIONS

This application is a national stage application under 35 U.S.C. § 371 of International Application PCT/IB2019/001348, filed Dec. 20, 2019, which is hereby incorporated by reference herein in its entirety.

BACKGROUND

The present disclosure relates to audio stream processing and, more particularly, to systems and related processes for transaction- and time-based audio stream processing.

SUMMARY

With the advent of audio streaming, speech transcription has gained a new level of notoriety but at the cost of greater complexity. Large enterprises have quickly learned to replace labor-intensive costs with price-effective automated voice-driven systems that all too well perform common services such as directing existing customers to consummating securities transactions, fulfilling consumer product orders, or directing potential customer inquiries. Whereas networks of not long ago lacked adequate streaming speeds to carry real-time audio files, large gains in recent technology advancements are allowing networks greater and broader opportunities. Enjoying the benefits of fast audio processing, small to large scale commercial enterprises now enjoy providing their customers with flexible cost-based speech-to-text applications.

Take the case of interactive voice recognition (IVR) services. A typical IVR service provides customers various capabilities, for example, servicing a financial security transaction through an E-Trade site, booking with a hotel or making a hospital appointment through respective websites, or servicing a common banking transaction request through a financial or third-party website. On the receiving end, an enterprise system automatically processes audio signals generated from user choice input, a user utterance for example, received through a user voice transmitter device, such as a user smartphone. In such user voice-driven applications, an utterance may be approximately 0.3 seconds in duration. Content discovery voice search engines in media equipment applications accommodating user voice-driven commands receive user utterance input of a similar duration. Through a smart television remote device, for example, a user may speak a short command, "turn to channel 7", to effect a channel change. An audio stream duration for securities transactions, placed through a handheld device, is not much different.

To decipher user utterances, enterprises typically send audio streams to audio speech recognition (ASR) services. ASR services convert audio streams into text files and send back the text files to requesting enterprises for relevant text extraction. In large scale applications, of which there are many, audio stream files are received in droves. Accordingly, existing speech-to-text (STT) services are a significant expense item for enterprises, in large part due to technology complexity, equipment maintenance, and requisite software and hardware enhancements. For example, a cable company may receive hundreds of thousands, if not millions or tens or even hundreds of millions of audio stream files from users located around the world nearly simultaneously. Systems must keep up with reliable and efficient processing of the massive numbers of incoming audio and audio-related signals.

Currently, each audio service recognition (ASR) service offered by companies like Google, Amazon, and Nuance, price an ASR request using a fixed and minimum cost financial model regardless of audio file duration. For example, a 1-second audio stream may incur the same minimum fixed fee for a 5-, 10- or even 15-second audio stream. The wide file size range and fixed-fee financial model is in large part based on a common connection load, the total number of parallel connections, irrespective of audio file duration. Beyond a threshold audio stream duration, however, processing utilization (such as central processing unit (CPU) use) for transcribing an audio file may and often does increase with audio file duration hence a different pricing model structure maybe employed. Stated differently, speech signals with significantly shorter durations are the subject of a different price model than those with longer durations.

In accordance with an existing financial model, employed by the entertainment industry-at-large, for example, audio signals with considerably shorter duration, in the order of 0-5 seconds, are typically priced per number of STT (or ASR) requests or during a predetermined time period. A reduction in the number of STT service requests or a reduction in audio stream length therefore serve as an incentive for reducing ASR service costs.

In accordance with disclosed embodiments and methods, a two-prong audio stream processing technique is employed, one that is transaction-based and another that is time-based. A decision to use one processing technique over the other is largely based on the ASR service financial model but it can be based at least in part on other non-related factors, as discussed below. In a system with a large number of file requests, a transaction-based approach may be better suited whereas a system with fewer, but longer audio files may warrant a time-based approach. In either approach, processing audio stream files prior to transmission to a STT service (or an automatic speech recognition (ASR) service) is optimized by sending a single payload (in a transaction-based approach) or compact files (in a time-based approach). More than one speech signal may form a single compact payload for transcription as a cost-saving and a system efficiency-enhancing measure, particularly at large scales. In the case of time-based approaches, dead time, e.g., silence or non-audible transmission periods, and non-meaningful speech content, are eliminated in compact audio files to shrink audio file sizes and reduce STT service costs. At scale, even greater cost savings may be realized based on a larger number of audio stream files.

In accordance with a pre-STT service transaction-based approach for audio stream processing, N number of audio streams are received during a time window, "N" being an integer value. Each or some of the N audio streams may be received from an independent or unique audio stream source and includes speech content. In non-limiting examples, audio streams may be received from user equipment devices, such as media or entertainment equipment devices, personal computing devices, or user handheld devices. For example, User A may utter a command through a remote control device of a smart entertainment set, User B may utter a command through a laptop microphone while User C may verbalize a command through a smart phone microphone.

In some embodiments, N–1 number of audio stream separators may be generated based on N-number of audio streams. In response to receiving the audio streams, a determination may be made as to whether at least some of the audio streams require transaction-based speech-to-text services and in response to determining that at least one of the audio streams does not require transaction-based speech-to-text services, a determination may be made to perform time-based speech-to-text services on the received audio streams.

In accordance with a time-based service, an audio stream is compacted to generate a compacted audio stream and the compacted audio stream is transmitted to an ASR service for transcription of the speech content to text content. Performing compacting may include removing non-meaningful voice and/or silence from the speech content. In response to transmitting the compacted audio stream for transcription, text content transcription of the audio stream is received from the ASR service for relevant text extraction. Audio stream compacting increases the frequency of transmission of compacted audio streams. At scale, an even greater increase in the frequency of transmission may be realized.

In some embodiments and methods, each audio stream of a second set of processed audio streams, different than an initially-compacted set of audio streams, is trimmed to remove excess speech content from the speech content of each of the second set of the audio streams. Compacting of the second set of processed audio streams may be performed where transcription charges for transcription of audio streams are transaction-based, for example.

In some embodiments, in response to receiving an audio stream and in response to determining the received audio stream does not require time-based speech-to-text services, a transaction-based speech-to-text services approach is implemented. A set of N number of received audio streams (a "set" being a value with a range of 1 to N) is concatenated into a buffer to generate a concatenated audio stream and N−1 number of audio stream separators (or one audio stream less than the total number of audio streams in a set) are inserted into the concatenated audio stream. An audio stream separator is inserted between every two adjacent audio streams of the concatenated audio stream to generate a single audio stream payload. Each audio stream separator delineates a beginning of a next audio stream and an end of a preceding audio stream. The single audio stream payload is subsequently transmitted for transcription to an ASR service for converting speech content to text content for all or the set of N audio streams, as the case maybe. In response to transmitting the single audio stream payload for transcription, a text file is received from the ASR service. The text file includes text content delineated with the audio stream separators to designate separations between text content of each audio stream (or "audio file" or "audio stream file").

In some embodiments, the buffer size is based on a time window duration. That is, the speech content of each audio stream may have an associated duration and the buffer size maybe based on a multiple number of a maximum speech content duration among the durations of speech content of the set of audio streams. The maximum duration may correspond to a minimum base transcription service price. That is, transcription charges for transcription of received audio streams may be based on the maximum audio stream duration.

In an embodiment, the buffer may be of a variety of buffer types suitable for processing and storing audio streams. For example, the buffer may be a linear or circular buffer, a last-in-first-out or first-in-first-out buffer. The order of storing the audio streams may be based on or independent of the order in which the audio streams are received from audio sources.

In some disclosed methods, upon receipt of a transcribed text file from a STT (or ASR) service, or during post-STT service processing, each text content of a corresponding audio stream is separated from adjacent text files of corresponding adjacent audio streams in the single payload text file by the audio stream separators. As with pre-STT audio file processing, each delinaeated text file corresponds to an independent audio source.

Prior to a payload transmission for transcription, for each audio stream, a determination may be made as to whether the audio stream can be transmitted in its entirety during the time window and based on the determination, a remaining set of audio streams may be saved for transmission as a part of a subsequent single audio stream payload. For example, in the event one or more audio streams of a current set of audio streams is not received in their entirety during the time window, the one or more audio streams of the current set that are not received in their entirety may be saved in the buffer or other storage locations to be processed and transmitted to the ASR service with a subsequent payload while audio streams received in their entirely and/or previously scheduled for transmission with a current payload may be transmitted with the current payload. The subsequent audio stream payload may be made of another set of audio streams in the N audio streams or a set of audio streams in an N+1 (or N plus a number greater than one) audio streams, of the left-behind audio streams (not previously received in their entirety during a corresponding time window or not previously scheduled for transmission with a current payload) of a previous payload, or a combination. Accordingly, the current single audio stream payload may exclude the remaining set of audio streams.

Transmitting a single audio stream payload for transcription may be performed immediately following processing the last audio stream of a time window but no later than an end of a wait time, the wait time starting from a request for onboarding the buffer with one or more of the N audio streams and ending at a subsequent request to re-onboard the buffer with a next audio stream (of the same or a new set of N number of audio streams). Alternatively, transmitting a single audio stream payload for transcription may be performed immediately following processing the last audio stream of a time window but no later than an end of a wait time, the wait time starting from a request for onboarding the buffer with one or more of the set of N audio streams and ending at a subsequent request to re-onboard the buffer with a next audio stream (of the same or a new set). In some embodiments, transmitting a single audio stream payload for transcription may be performed after processing a predetermined number of audio streams regardless of a time window or it may based on a time window and a predetermined number of audio streams. Transmitting may be performed despite buffer density to prevent noticeable delays in receiving the text file. Where the audio streams have different audio stream sizes, disclosed methods may transmit the payload at the end of the time window regardless of audio stream sizes.

BRIEF DESCRIPTION OF THE DRAWINGS

The above and other objects and advantages of the disclosure will be apparent upon consideration of the following detailed description, taken in conjunction with the accompanying drawings, in which:

FIG. 3A shows a part of exemplary single audio stream payload 300, built by an audio stream processor of disclosed methods and systems;

FIG. 3B shows an exploded view of audio stream "b" of FIG. 3A;

DETAILED DESCRIPTION

Figure 1:
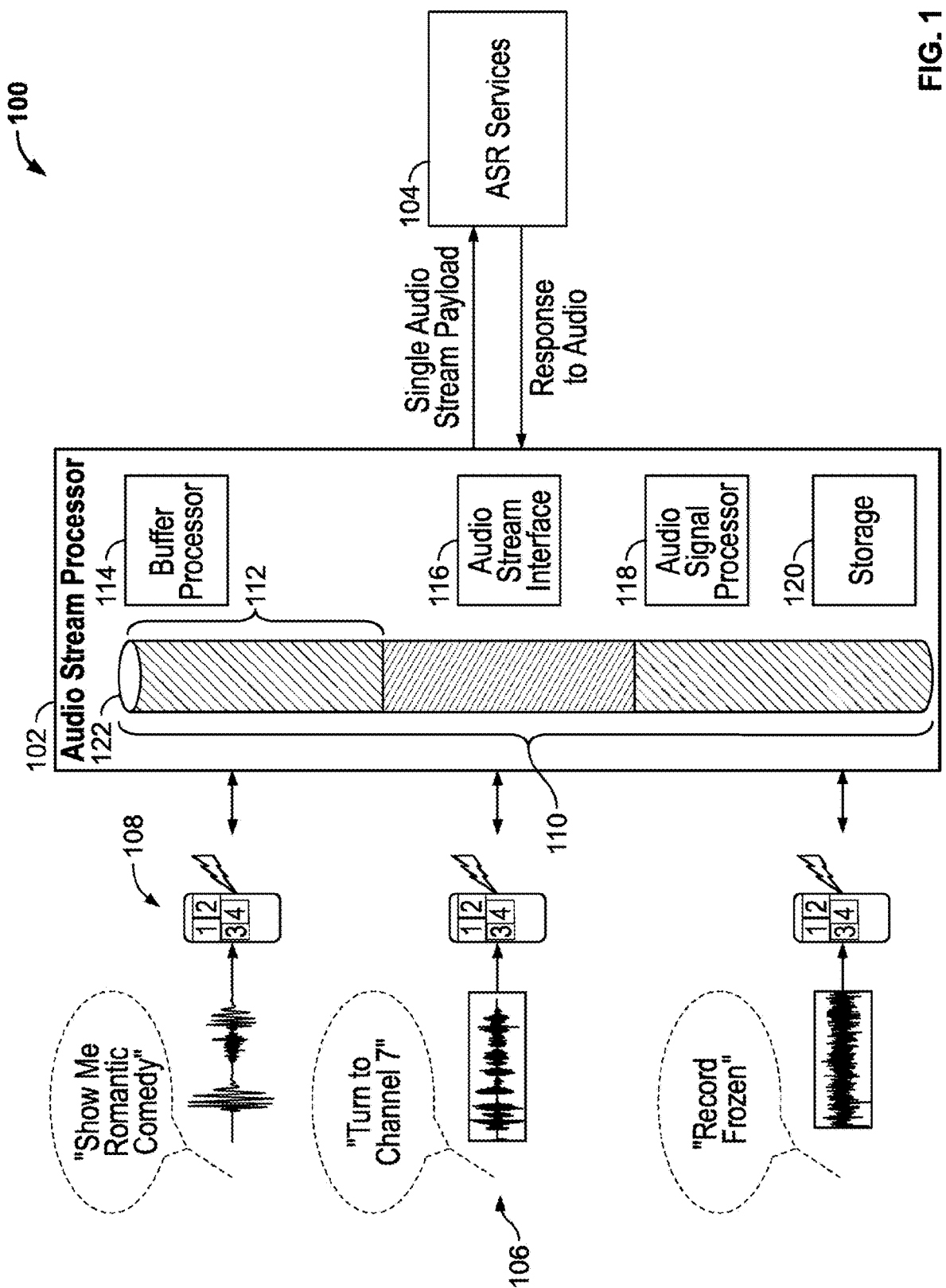
FIG. 1 illustrates an overview system of a transaction-based ASR services system, in accordance with some embodiments of the disclosure.

FIG. 1 illustrates an overview system of transaction-based ASR services, in accordance with some embodiments of the disclosure. In FIG. 1, a transaction-based ASR services system is configured as a transaction-based ASR services system 100 to include an audio stream processor 102 receiving audio stream files from multiple and independent audio sources 108. Audio stream processor 102 is further shown to provide a single audio stream payload 110 for audio-to-text services to ASR services 104. Audio sources 108 receive audio input 106, generally provided by respective users who may be located around the world. Audio sources 108 may receive non-user generated audio input, in some embodiments. In a non-limiting example, audio sources 108 may receive automated commands from users, bots or machine-learning or artificial intelligence processing sources.

Audio stream processor 102 may transmit and receive audio and audio-related data to and from audio sources 108 in various manners. For example, communications between audio steam processor 102 and one or more audio sources 108 may be implemented through a wireless (WiFi) network, wired network, local area network (LAN), or using Bluetooth as further discussed with reference to FIG. 7.

Each of the audio sources 108 may be a remotely or locally situated device relative to audio stream processor 102. In non-limiting application examples, audio sources 108 comprise laptops, entertainment equipment or handheld devices, or any other suitable audio source. In some embodiments, one or more audio sources 108 or one or more audio input 106 may be generated by the same respective source or same user (or bot), for example.

In the particular embodiment of FIG. 1, three audio input 106 are received by three respective audio sources 108. Each audio stream generated from one of the three audio input 106 includes speech content. For example, still referring to FIG. 1, each of the three exemplary audio input 106 is shown to include user audio commands "Show me romantic comedy," "Turn to channel 7", and "Record Frozen." It is understood that while three input 106 and three sources 108 are shown and discussed herein, any other number of input and sources may be employed. In a typical system 100 application, the number of input and sources can exceed hundreds and millions.

As previously indicated, audio stream processor 102 may receive audio stream files from one or more locally-situated audio sources 108. For example, one or more of the sources 108 may reside in media equipment devices and communicatively coupled to audio stream processor 102. In some embodiments, audio stream processor 102 and one or more of the audio sources 108 are remotely located. For example, audio stream processor 102 may reside in a network cloud, such as a network server, while one or more of the sources 108 may be situated in remotely-located user devices, such as laptops or handheld devices communicatively coupled to audio stream processor 102 through the network cloud (or "communication network"), as discussed relative to FIG. 7.

Audio stream processor 102 is shown to include a buffer 122, a buffer processor 114, an audio stream interface 116, an audio signal processor 118, and a storage 120, any, all, or a combination of which may be implemented in hardware, software, or virtually. For example, buffer 122 may be made of registers, volatile or non-volatile memory, or database devices. Buffer 122 may alternatively or additionally comprise pointers to memory or storage locations or virtual addresses that when mapped to logical and ultimately physical addresses point to physical storage or memory, such as but not limited to storage 120. Buffer 122 may therefore comprise any form of suitable storage for audio and audio-related files.

Buffer processor 114 generally manages data access from and to buffer 122; audio stream interface 116 generally manages data input/output functions to and from audio stream processor 102; audio signal processor 118 generally performs audio and audio-related processing functions and arbitration of data input to the audio stream processor 102 and data output from audio stream processor 102 and further directs other components of the audio stream processor 102, such as buffer processor 114, audio stream interface 116, and storage 120, in performing respective functions; and storage 120 generally maintains data and program instructions utilized by audio stream processor 102 in carrying out its operations. It is understood that anyone or a combination of the buffer processor 114, audio stream interface 116, audio signal processor 118, and storage 120 may be located locally or remotely relative to one another and relative to audio stream processor 102. For example, storage 120 may be a part of a device or devices housing buffer 122 or it may be remotely-situated with respect to buffer 122. Similarly, audio signal processor 118 may be locally or remotely situated relative to buffer 122 and/or storage 120. In a non-limiting example, at least a part of buffer 122 and buffer processor 114 are locally situated relative to one another to effect efficient data access to buffer 122. Similarly, at least a part of storage 120 may be locally situated relative to buffer 122 to enhance system performance by allowing fast memory and/or storage transactions. For example, at least a part of storage 120 may be made of cache memory to facilitate fast instruction execution.

As will be evident relative to the following operational example of FIG. 1, in response to transmitting a single payload, such as single audio stream payload 110 to ASR services 104, audio stream processor 102 may receive from ASR services 104 a single text file or transcription of all audio stream files transmitted to ASR services 104.

In an operational example, through audio stream interface 116, audio stream processor 102 receives audio stream files from audio sources 108 during a time window. Buffer processor 114, with the assistance of audio signal processor 118, saves the received audio stream files into the buffer 122. In some embodiments, buffer processor 114, under the direction of audio signal processor 118, may save received audio stream files in storage 120 for audio stream processing and after processing, buffer processor 114 may transfer the processed audio streams to buffer 122 for transmission to the ASR services. The time window may be programmably set by, for example, the buffer processor or audio signal processor. The time window may be set based on an expected and/or average audio stream duration range, audio stream transmission rates (from audio sources 108), and/or time window determination basis for proper audio stream processor operation.

Audio signal processor 118 and buffer processor 114 may execute program instructions stored in storage 120 to implement the functions performed on and in buffer 122 to process the incoming audio files. Buffer processor 114 may be directed by audio signal processor 118 to perform buffer 122-related functions. It is understood that storage 120 may be made of one or more storage devices locally or remotely situated relative to one another. In some embodiments, storage 120 may comprise logical or virtual links or pointers that uniquely identify one or more physical address including the data of interest or the address where the data of interest is to be stored.

In a general example, through audio stream interface 116, audio stream processor 102 receives "N" number of audio stream files from audio sources 108 where "N" is an integer value. Before storing the audio stream files in buffer 122, buffer processor 114 concatenates a set of the received audio streams to generate a concatenated audio stream. The set may be one or more, up to and including N, number of audio streams. Before storing the received audio streams in the buffer 122, buffer processor 114 further generates N−1 (or one less than the total number of audio streams in the set of audio streams) audio stream separators for the N audio stream files. For example, in system 100, buffer processor 114 may generate an audio stream separator for every two adjacent audio streams of the concatenated audio stream to generate a single audio stream payload, such as single audio stream payload 110. The total number of audio stream separators is therefore typically one less than the total number of audio streams of a concatenated audio stream. Each audio stream separator delineates a beginning of a next audio stream and an end of a preceding audio stream. In some embodiments, buffer processor 114 generates audio stream separators after storing the received audio streams in the buffer 122.

In the example of FIG. 1, three audio stream separators are generated for the three audio stream files received from sources 108. That is, the set of audio stream files equals N received audio stream files. It is understood that for a different number of sources a corresponding different number of audio stream separators may be generated by buffer processor 114.

In some embodiments, buffer processor 114 stores the concatenated audio stream in the buffer 122 and then adds the audio stream separators as delineations markers between each two adjacent stored audio files of a concatenated audio file. In some embodiments, buffer processor 114 first adds the audio stream separators to the concatenated audio stream while the concatenated audio stream is stored in a location other than buffer 122, for example storage 120, and upon completion of processing (generating the single audio stream payload 110), buffer processor 114 transfers the generated payload to buffer 122 for transmission to ASR services 104.

In the example of FIG. 1, buffer processor 114 concatenates the three audio stream files with an audio stream separator between every two adjacent audio streams of the concatenated audio stream in buffer 122 to generate the single audio stream payload 110, each audio stream separator delineating a beginning of a next audio stream and an end of a preceding audio stream separators. Upon generating and inserting all (N−1) audio stream separators into the three audio streams, buffer processor 114 stores the three audio streams with inserted audio stream separators, collectively forming the single audio stream payload 110, in buffer 122. As previously indicated, each audio stream of a concatenated audio stream is separated from a next or adjacent audio stream by an audio stream separator between every two adjacent audio streams of the concatenated audio stream in buffer 122, forming the single audio stream payload 110. For example, audio stream 112 is separated from an immediately previous and adjacent audio stream, shown directly below stream 112 with dashed hashed lines, by an audio stream separator, and an immediately preceding audio stream to the previous audio stream, shown by opposite cross hashed lines immediately below the previous audio stream (in buffer 122), is separated from the previous audio stream by another audio stream separator. In this respect, an audio stream separator is inserted between every two adjacent audio streams of the concatenated audio stream in the buffer 122 to generate the single audio stream payload 110, each audio stream separator delineating a beginning of a next audio stream and an end of a preceding audio stream of a concatenated audio stream.

In an embodiment, audio stream processor 102 receives the N audio streams from sources 108 during a set time window. The size of buffer 122 may be based on a duration of the time window. In some embodiments, the buffer size may be based on a multiple of the maximum audio stream duration. For example, where three audio streams of 3, 5, and 8 seconds in duration are received by audio stream processor 102, the buffer size must be large enough to accommodate a time window of 16 seconds.

Under the direction of audio signal processor 118, audio signal processor 118 or buffer processor 114, as the case maybe, transmits the single audio stream payload 110 for transcription of each of the N audio file speech content- (of each audio stream) to-text content, through audio stream interface 116, to ASR services 104. In response, audio stream processor 102, through audio stream interface 116, receives a transcription of each of the speech content of the N audio streams in the form of a single text content file from ASR services 104. The received text file may include the text content of all N audio files delineated with the audio stream separators. In the case where a set of audio files that includes less than N number of audio files is included in the payload, the received text file includes a number of text files corresponding to the set number of audio files. Audio stream processor 102 may then perform extraction of, or solicit an independent device or service, to perform extraction of relevant text information from one or more of the N text content files.

Audio stream processor 102 may transmit and receive data to and from ASR services 104 in various manners. For example, communications between audio steam processor 102 and ASR services 104 may be implemented through a wireless or wired network, such as WiFi and local area network (LAN), respectively.

In some embodiments, the size of buffer 122 is based on a time window duration. That is, the speech content of each audio stream may have an associated duration and the buffer size maybe based on a multiple number of a maximum speech content duration among the durations of the speech content of the set of audio streams. The maximum duration may correspond to a minimum base transcription service price. That is, transcription charges for transcription of received audio streams may be based on the maximum audio stream duration.

In some disclosed methods, upon receipt of a transcribed text file from a STT (or ASR) service, or during post-STT service processing, each text content of a corresponding audio stream is separated from adjacent text files of corresponding adjacent audio streams in the single payload text file by the audio stream separators. As with pre-STT audio file processing, each delinaeated text file corresponds to an independent audio source.

Prior to the transmission of payload 110 for transcription, for each audio stream, buffer processor 114 may make a determination as to whether the audio stream can be transmitted in its entirety during the time window and based on the determination, a remaining set of audio streams may be saved for transmission with a subsequent single audio stream payload. For example, in the event one or more audio streams of a current set of audio streams are not received in their entirety during the time window, the one or more audio streams of the current set that are not received in their entirety may be saved in the buffer or other storage locations to be processed and transmitted to the ASR service with a subsequent payload while audio streams received in their entirely during the time window and/or previously scheduled for transmission with a current payload may be transmitted with the current payload. The subsequent audio stream payload may be made of another set of audio streams in the N audio streams or a set of audio streams in an N+1 (or N plus a number greater than one) audio streams, left-behind audio streams (not previously received in their entirety during a corresponding time window or previously scheduled for transmission with a current payload) of a previous payload, or a combination. Accordingly, the current single audio stream payload may exclude the remaining set of audio streams.

Transmitting a single audio stream payload, such as payload 110, for transcription may be performed immediately following processing the last audio stream of a time window but no later than an end of a wait time, the wait time starting from a request for onboarding the buffer with one or more of the N audio streams and ending at a subsequent request to re-onboard the buffer with a next audio stream (of the same or a new set of N number of audio streams). Alternatively, transmitting a single audio stream payload for transcription may be performed immediately following processing the last audio stream of a time window but no later than an end of a wait time, the wait time starting from a request for onboarding the buffer with one or more of the set of N audio streams and ending at a subsequent request to re-onboard the buffer with a next audio stream (of the same or a new set). In some embodiments, transmitting a single audio stream payload for transcription may be performed after processing a predetermined number of audio streams regardless of a time window or it may based on a time window and a predetermined number of audio streams. Transmitting may be performed despite buffer density to prevent noticeable delays in receiving the text file. Where the audio streams have different audio stream sizes, disclosed methods may transmit the payload at the end of the time window regardless of audio stream sizes.

In an embodiment, buffer 122 may be configured in a variety of buffer type implementations suitable for processing and storing audio streams. For example, buffer 122 may be a linear or circular buffer, a last-in-first-out or first-in-first-out buffer. The order of storing the audio streams may be based on or independent of the order in which the audio streams are received from audio sources.

Figure 2:
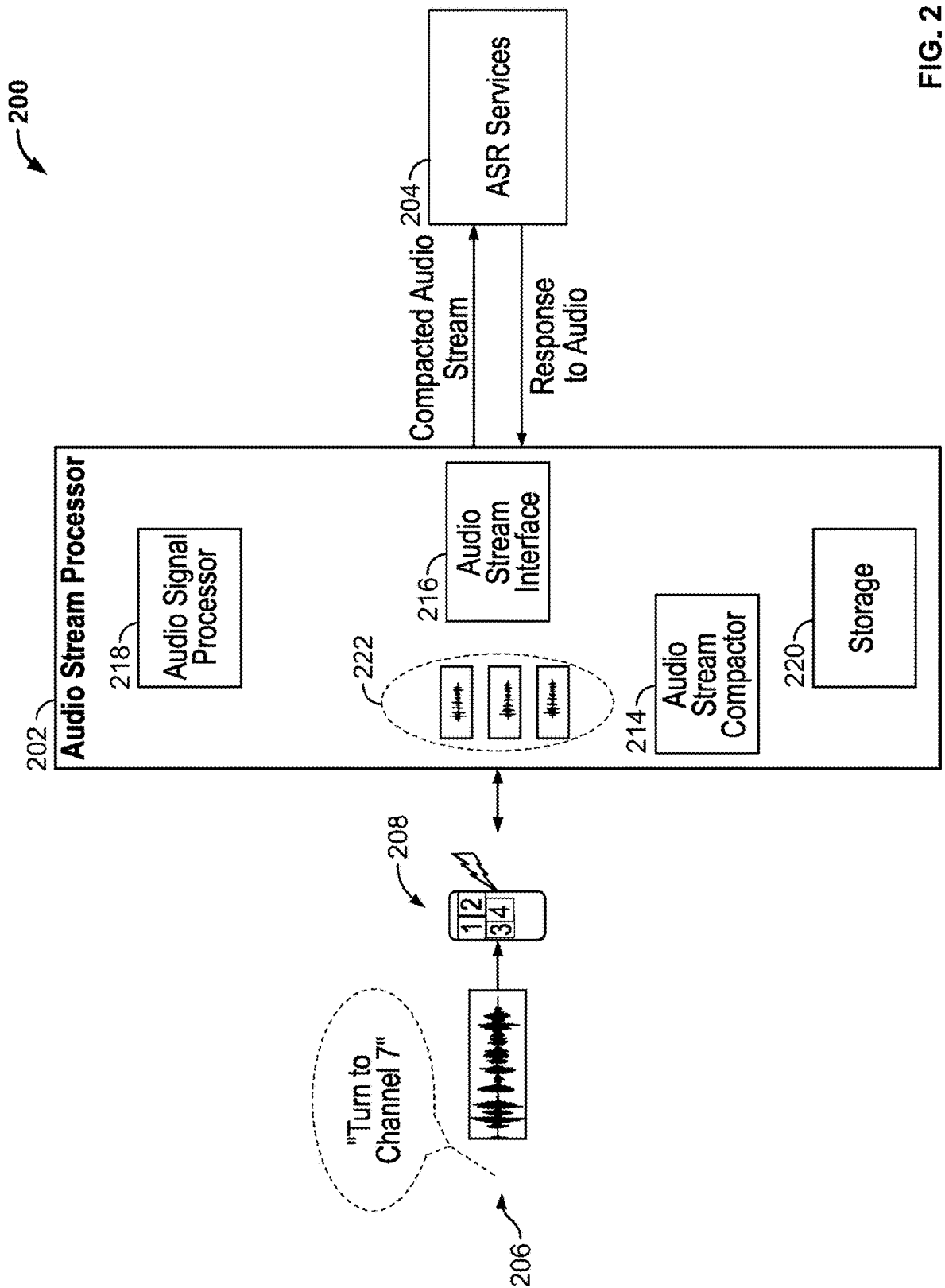
FIG. 2 illustrates an overview system of a time-based ASR services system, in accordance with some embodiments of the disclosure.

FIG. 2 illustrates an overview system of time-based ASR services, in accordance with some embodiments of the disclosure. In FIG. 2, a time-based ASR services system is configured as a time-based ASR services system 200 to include an audio stream processor 202 receiving audio stream files from an audio source 208. Audio stream processor 202 is further shown to provide a compacted audio stream for audio-to-text services to ASR services 204. Each of ASR services 104 and 204 may be an ASR service suitable for processing audio signals. For example, ASR services 104 and 204 may be performed by any of various ASR service providers including, without limitation, Google LLC of Mountain View, CA and Amazon.com, Inc. of Seattle, WA.

Audio source 208 receives audio input 206, generally provided by a respective user who may be located around the world. Audio source 208 may receive non-user generated audio input. In a non-limiting example, audio source 208 may receive automated commands from one or more users, bots or machine-learning or artificial intelligence processing sources. In this respect, audio source 208 is analogous to the sources 108 of FIG. 1. Indeed, with the exception of functions and embodiments discussed herein or those of obvious variants, the system 200 is analogously configured as system 100.

In system 200, while one audio stream is presumed received by audio stream processor 202, it is understood that typically more than one audio stream may be received from the same or other sources. For example, audio stream processor 202 may receive three audio streams 222. In some embodiments, audio signal processor 218, audio stream interface 216, and storage 220 are configured as audio signal processor 118, audio stream interface 116, and storage 120, respectively, of FIG. 1.

In an exemplary operational scenario, audio stream processor 202 receives, through audio stream interface 216, an audio stream including speech content from audio source 208. Audio stream compactor 214, operating under the direction of audio signal processor 218, compacts the received audio stream to generate a compacted audio stream. Audio stream processor 202 transmits the compacted audio stream for transcription, through audio stream interface 216, to ASR services 204. In response to transmitting the compacted audio stream for transcription, audio stream processor 202, through audio stream interface 216, receives from ASR services 204 a text file with text content that is a transcription of the audio stream. Audio stream processor 202 may itself or through the solicitation of an independent device or service effect text content search of the returned text file for relevant information.

Audio stream compactor 214 may compact the audio stream from audio source 208 in a variety of manners. Done in any suitable manner, compacting an audio stream may remove non-meaningful voice and/or silence from the speech content of an audio stream while compacting the audio stream (or "audio file") to increase the frequency of transmission of the audio stream to ASR services 204. Compacting the audio stream may comprise trimming the audio stream to remove excess speech content from the speech content of the audio stream. It is understood that more than one audio stream may be trimmed at any given time. In some embodiments, compacting includes trimming the audio stream of a second set of one or more audio streams to remove excess speech content from the speech content of each of the second set of audio streams. Trimming of the second set of audio streams may be performed where transcription charges for transcription of processed audio streams are transaction-based for improved improve cost-effectiveness, for example.

In some embodiments, audio stream compactor 214 performs audio stream compacting by use of lossy or lossless compression algorithms. For example, run-length encoding and decoding may be employed by implementing Lempel-Ziv (LZ) or Lempel-Ziv-Welch (LZW) algorithms. Audio stream compactor 214 may be configured in hardware, software or virtually.

In an embodiment, either or both audio streams of systems 100 and 200 may be encrypted for privacy and reliability reasons. In such cases, decryption may be necessary at a receiving end.

FIGS. 3A and 3B show an exemplary single audio stream payload part, in accordance with disclosed methods and embodiments. Analogous to audio stream payload 110, single audio stream payload 300 may be generated by audio stream processor 102 of FIG. 1 and stored in buffer 122 by buffer processor 114, as previously described relative to FIG. 1. FIG. 3A shows a part of exemplary single audio stream payload 300, built by an audio stream processor of disclosed methods and systems. Payload 300 is shown with three audio streams, audio stream "a", audio stream "b", and audio stream "c". Each audio stream "a"-"c" includes two fields, an audio stream content 302 and an audio stream header 304. For example, audio stream content 302 comprises a series of audio stream contents 302a, 302b, and 302c, each from a unique and independent source or a combination of unique and independent sources, such as sources 108, as earlier described relative to FIG. 1. Audio stream header 304 is a series of audio stream headers, 304a, 304b, and 304c, each belonging to a corresponding audio stream "a"-"c", respectively. Similarly, audio stream separator 306 is a series of audio stream separators, 306a-306c, each separating two adjacent audio streams of audio streams "a"-"c". For example, audio stream separator 306a is shown to delineate audio stream "a" from a preceding audio stream (not shown in FIG. 3A), audio stream separator 306b is shown to delineate audio stream "a" from audio stream "b" (or audio stream content 302a and audio stream header 304b), and audio stream separator 306c delineates audio stream "b" from audio stream "c" (or audio stream contents 302b and audio stream header 304c).

In an embodiment, each separator 306a-306c is effectively an audio stream delineation indicator and may be implemented in a variety of manners. For example, each audio stream separator may be a flag, bit (or bytes), a particular memory address or a particular value, a pointer, linked list, or any other designator uniquely identifying the location between two adjacently situated independent audio streams.

Audio stream headers 304a-304c each describe aspects of a corresponding audio stream content. In a non-limiting example, an audio stream header may indicate an audio stream content transmission time, the time at which a corresponding audio stream content was transmitted by a corresponding audio source, or an audio stream length, the length of a corresponding audio stream or audio stream content, or whether or the type of encoding/decoding possibly employed prior to transmission and upon receipt of an audio stream, respectively. In this respect, audio stream header 304a includes information relating to audio stream content 302a of audio stream "a"; audio stream header 304b includes information relating to audio stream content 302b of audio stream "b"; and audio stream header 304c includes information relating to audio stream content 302c of audio stream "c". While shown located at the beginning of each audio stream "a", "b", and "c", in some embodiments, an audio stream header may be located at the end of or embedded within a corresponding audio stream.

Audio stream content may and typically does include meaningful voice information and non-meaningful voice or silent periods. Non-meaningful information may be the utterance of "Uh" or "Uhm" and a silent period may be a period where no voice or speech is audible or comprehensible.

In FIG. 3B, an exploded view of audio stream "b" of FIG. 3A is shown to include non-meaningful voice and/or silent audio content at 310 while meaningful speech content is shown at 312. In accordance with an embodiment, such as the system 200, audio stream compactor 214 of FIG. 2 would remove the non-meaningful voice and/or silent content parts of the audio stream (shown at 310 in FIG. 3B) while leaving the meaningful speech content 312 hence reducing the audio stream size of audio stream "b" by approximately 30% and increasing system efficiency by approximately 30%, for instance. In some embodiments, the net result is a reduction in ASR service expenses. In some embodiments, an audio stream may be further compacted by trimming at least some of the audio stream header. For example, while the identity of an audio source may remain relevant, the time of audio stream transmission may be a suitable candidate for removal.

Figure 4:
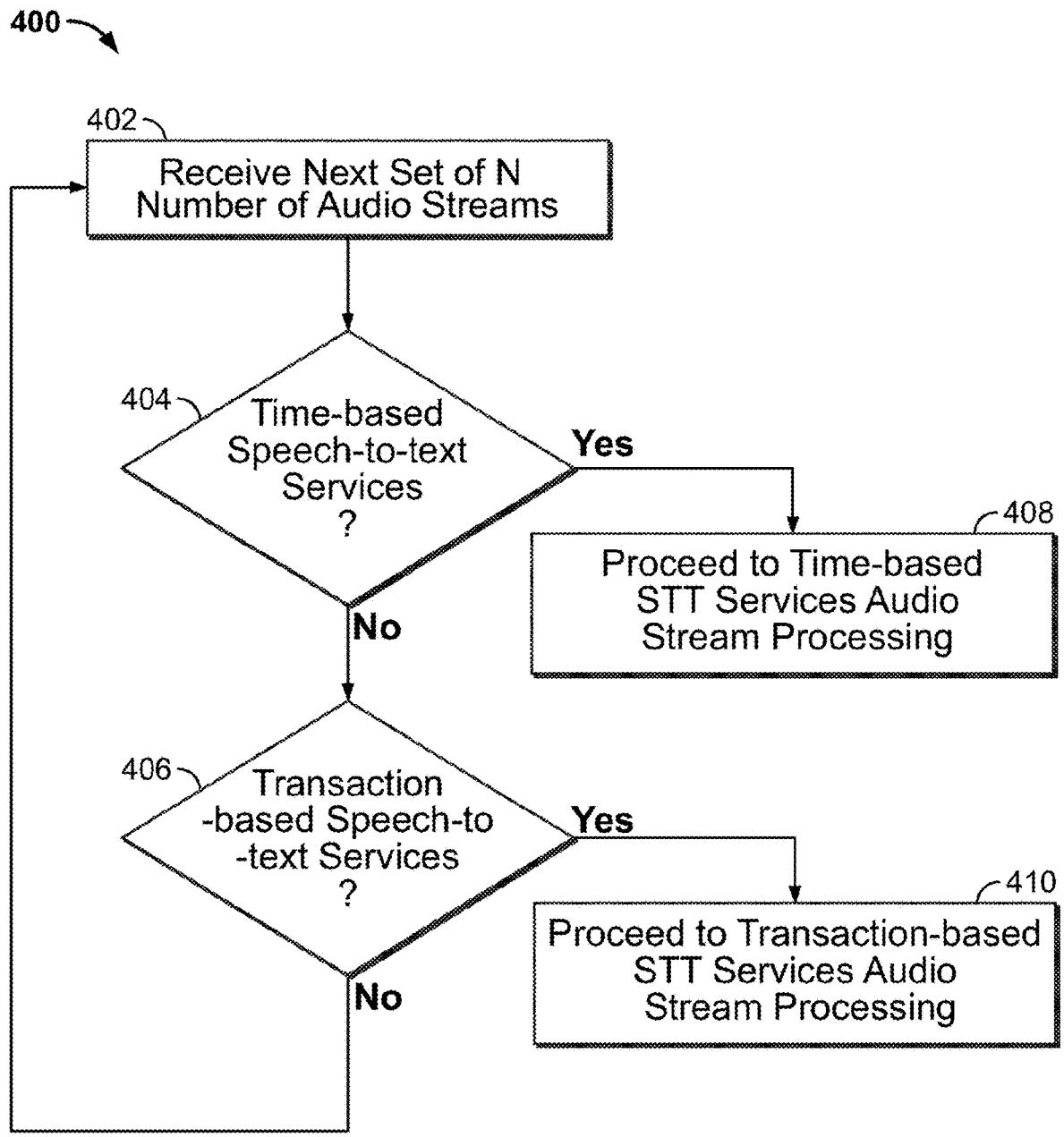
FIG. 4 depicts an illustrative flowchart of a process for determining a STT (or ASR) service approach based on incoming audio streams, in accordance with some embodiments of the disclosure.

In some embodiments, the system may determine the speech-to-text service based on incoming audio streams, such as those from audio sources 108 of FIG. 1 or 208 of FIG. 2. FIG. 4 depicts an illustrative flowchart of a process for determining a STT (or ASR) service approach based on incoming audio streams. In FIG. 4, a process 400 is shown in flowchart form for determining an appropriate STT service based on an analysis of incoming audio streams. In some embodiments, process 400 may be implemented by the audio signal processor 118 of FIG. 1 or the audio signal processor 218 of FIG. 2. It is understood that other suitable signal processor or computing devices may implement the steps and determinations of process 400.

At step 402, an N number of audio streams are received, for example by audio stream processor 102 or 202, of FIGS. 1 and 2, respectively. Next, at 404, a determination is made as to whether the incoming audio streams are to be time-based STT serviced. If at 404, the determination is made to service the audio streams using a time-based approach ("Yes" at 404), process 400 continues onto to step 408 and a time-based STT service approach, for example, like the STT service approach of FIG. 2, is implemented. Otherwise ("No" at 404), process 400 proceeds to 406 where a second determination is made. At 406, the determination is based on a transaction-based service approach. If at 406, a determination is made to implement a transaction-based service approach ("Yes" at 406), process 400 proceeds to step 410 where a transaction-based STT service, such as that of FIG. 1, is implemented. If the determination at 406 yields a negative outcome ("No" at 406), process 400 may resume to process a next batch of N audio streams starting from step 402. In some embodiments where other forms of STT services are available, process 400 may proceed to test for other services after the determination at 406 yields a negative result instead of continuing from step 402. Process 400 may end upon testing for all available STT services or process 400 may resume from step 402 when test for all available STT services is exhausted.

In some embodiments, the order of steps and determinations of process 400 may be changed. For example, the determinations at 404 and 406 may be swapped such that the process tests for a transaction-based approach prior to testing for a time-based approach.

The determination to proceed with a transactional versus a time-based approach may rest, at least in part, on a number of audio stream- or environment-related factors. For example, if the average audio stream size of N number of audio streams exceeds a threshold, process 400 may choose a time-based service approach. In a slow network environment, a transactional-based service approach may be better suited. In some embodiments, determining whether at least one of the audio streams requires transaction-based speech-to-text services is simply based, at least in part, on the ASR services 104 cost-structure. In some embodiments, determining whether at least one of the audio streams requires transaction-based speech-to-text services is based, at least in part, on the size of the time window for receiving the N number of audio streams.

Figure 5:
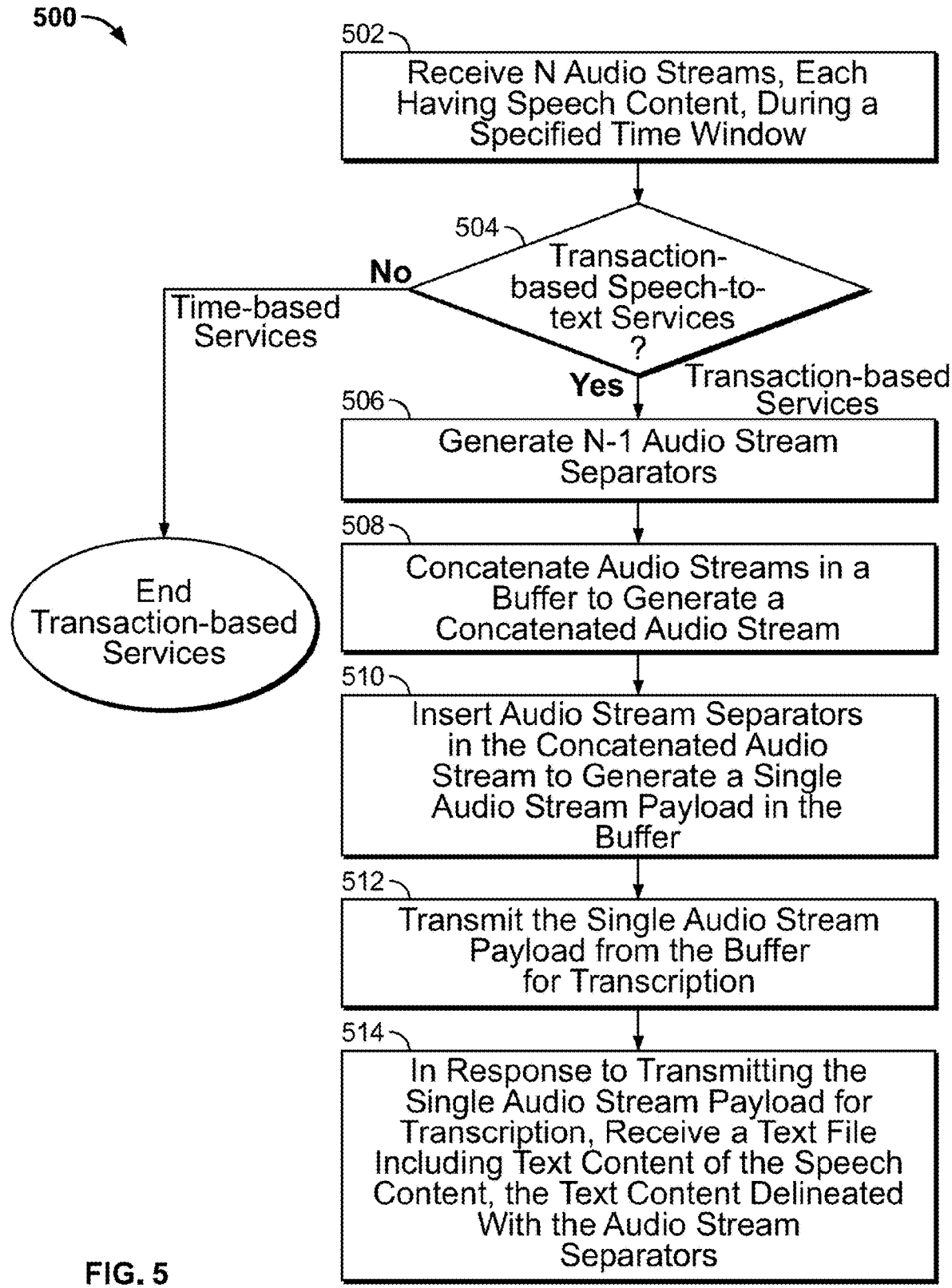
FIG. 5 depicts an illustrative flowchart of a process for determining a transaction-based STT service approach, in accordance with some embodiments of the disclosure.

FIG. 5 depicts an illustrative flowchart of a process for determining a transaction-based STT service approach. In FIG. 5, a process 500 is shown in flowchart form for determining a transaction-based STT services approach. The steps and determinations of process 500 will be described relative to FIG. 1 but it is understood that process 500 or any derivations thereof may be equally applicable to embodiments other than that of FIG. 1.

At step 502, in FIG. 5, N number of audio streams, each with speech content, are received during a specified time window. Speech content of each of the N audio streams is analogous to audio stream content 302a, 302b and 302c of FIG. 3A. Audio stream interface 116 may receive 3 audio streams from sources 108, as previously described relative to FIG. 1. Next, at 504, a determination may be made by buffer processor 114 or audio signal processor 110 as to whether the ASR service to-be-performed is transaction-based or not and if not ("No" at 504), process 500 ends at 516. Otherwise ("Yes" at 504), process 500 continues to step 506. In some embodiments, instead of ending at 516, process 500 may test for other types of ASR services, such as a time-based service or still other services, as described relative to FIG. 4.

At step 506, buffer processor 114 generates N−1 audio stream separators and process 500 next implements step 508. At step 508, buffer processor 114 or audio signal processor 110 concatenate the N audio streams into a buffer, such as buffer 122, to generate a single concatenated audio stream. Process 500 subsequently performs step 510. At step 510, the audio stream separators generated at step 506 are inserted into the concatenated audio stream of step 508 to generate a single audio stream payload in buffer 122. It is understood that while buffer 122 is shown as a single buffer unit or device, buffer 122 may comprise more than one device, therefore, dispersing the single audio stream payload across multiple buffer devices. Next, after completion of step 510, at step 512, audio stream processor 102 transmits the single audio stream payload (such as payload 110) of step 510 from buffer 122 to an ASR service, such as without limitation, ASR service 104, through audio stream interface 116 for transcription.

Audio stream processor 102 may transmit the generated single audio stream payload for transcription immediately following the processing of the last or Nth audio stream. For example, audio stream processor 102 may transmit the single audio stream payload 110 after insertion of the N−1 audio stream separator into the concatenated audio stream.

In an embodiment, buffer processor 114 of audio stream processor 102 makes a request of audio signal processor 118 to onboard the next set of N audio streams onto buffer 110. Audio stream processor 102 may transmit the single audio stream payload no later than an end of a wait time, the wait time starting from a request for onboarding buffer 122 with one or more of the N audio streams and ending at a subsequent request to re-onboard buffer 110 with the next batch (or set) of N audio streams.

Buffer 122 may be filled to capacity upon building payload 110 but in some embodiments, payload 110 may not consume the entire capacity of buffer 122. For example, the time window for receiving all N audio streams may close before the buffer is full or the audio streams may be too short to fill buffer 122 to capacity. In some embodiments, audio stream processor 102 transmits payload 110 to ASR services 104 from buffer 122 despite the density of buffer 122 to prevent noticeable delay by ASR services 104 in receiving the text file.

The N audio streams from sources 108 may have different audio stream sizes. In some embodiments, payload 110 is transmitted when the specific time window ends despite the audio stream sizes. Prior to the transmitting step 512, in FIG. 5, audio signal processor 118 of audio stream processor 102 may determine, for each of the N audio streams, whether the audio stream can be transmitted in its entirety during the time window and based on the determination, audio signal processor 118 may then transmit only a subset of the N audio streams, those that have been received in their entirety while leaving a remaining subset of partially-received audio streams for future transmission.

Figure 6:
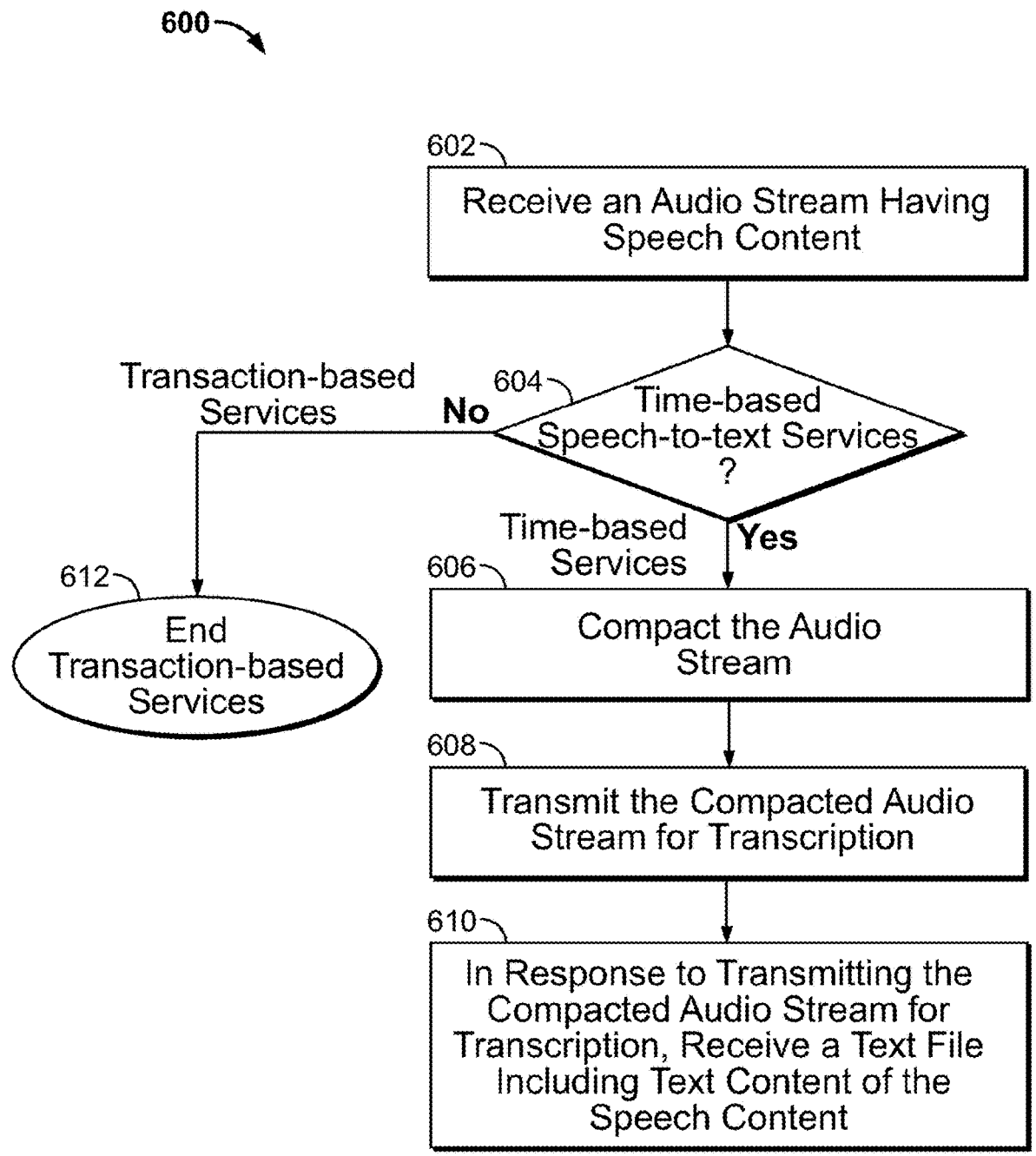
FIG. 6 depicts an illustrative flowchart of a process for determining a time-based STT service approach, in accordance with some embodiments of the disclosure.

FIG. 6 depicts an illustrative flowchart of a process for determining a time-based STT service approach. In FIG. 6, a process 600 is shown in flowchart form for determining a time-based STT services approach in accordance with disclosed methods. The steps and determinations of process 600 will be described relative to FIG. 2 but it is understood that process 600 or any derivations thereof may be equally applicable to embodiments other than that of FIG. 2.

At step 602, an audio stream is received from an audio source, such as source 208. The audio stream includes speech content, such as audio stream content 302a, 302b and 302c of FIG. 3A. The audio stream may be received through audio stream interface 216 of audio stream processor 202. At 604, the audio signal processor 218 determines whether ASR services are to be performed pursuant to a time-based approach. Audio signal processor 218 may make the determination at 604 based on various factors, such as but not limited to those discussed above. At 604, a determination may be based on whether at least one of the received audio streams requires time-based speech-to-text services. The foregoing determination may be based at least in part on an average size of N number of audio streams or an average size of the set of audio streams in an application receiving N audio streams.

If a time-based approach is determined not to be implemented ("No" at 604), process 600 ends at 612, otherwise ("Yes" at 604), process 600 continues to step 606. In some embodiments, the determination at 604 may be performed as described relative to FIG. 4.

At step 606, audio stream compactor 214 compacts the received audio stream and process 600 continues to step 608. Next, at step 608, audio signal processor 218 transmits the compacted audio stream, through audio stream interface 216, to ASR services 204 for transcription. At step 610, in response to transmitting the compacted audio stream to ASR services 204, audio stream processor 202 receives, from ASR services 204 through audio stream interface 216, a text file with text content of the of the audio stream speech content.

Figure 7:
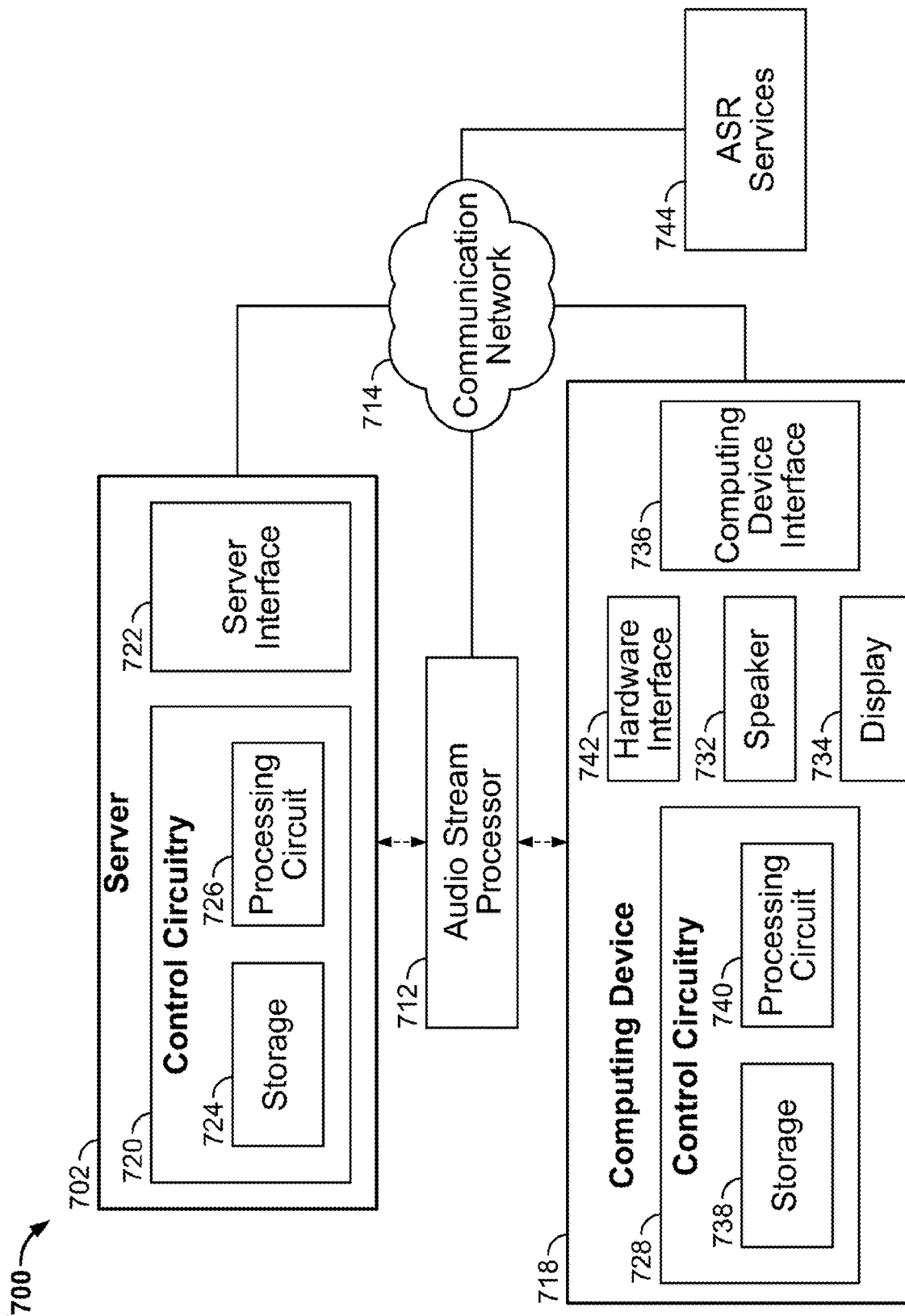
FIG. 7 is an illustrative block diagram showing an audio processing system, in accordance with some embodiments of the disclosure.

FIG. 7 is an illustrative block diagram showing an audio processing system, in accordance with some embodiments of the disclosure. In FIG. 7, audio processing system is configured as audio processing system 700 in accordance with some embodiments of the disclosure. In an embodiment, a part or the entirety of system 700 may be configured as either of systems 100, 200, of FIGS. 1, 2, respectively. Although FIG. 7 shows a certain number of components, in various examples, system 700 may include fewer than the illustrated number of components and/or multiples of one or more of the illustrated number of components.

System 700 is shown to include a server 702, a computing device 718, an audio stream processor 712, an ASR services 744, and a communication network 714. Each of the server 702, computing device 718, audio stream processor 712, and ASR services 744 is communicatively coupled to communication network 714. In an embodiment, server 702 may be configured as one or more network elements in communication network 714. In an embodiment, server 702 resides externally to communication network 714, as shown in FIG. 7.

In some embodiments, computing device 718 may be configured as all or part of one of the audio stream sources 108 of FIG. 1 or one of the audio stream sources 208 of FIG. 2. Alternatively, any of the sources 108 may form a part of computing device 718. In an embodiment, server 702 may be configured as audio stream processor 102 or audio stream processor 202.

Communication network 714 may comprise one or more network systems, such as, without limitation, an Internet, LAN, WiFi or other network systems suitable for audio processing applications. In some embodiments, system 700 excludes server 702 and functionality that would otherwise be implemented by server 702 is instead implemented by other components of system 700, such as one or more components of communication network 714. In still other embodiments, server 702 works in conjunction with one or more components of communication network 714 to implement certain functionality described herein in a distributed or cooperative manner. Similarly, in some embodiments, system 700 excludes audio stream processor 712 and functionality that would otherwise be implemented by audio stream processor 712 is instead implemented by other components of system 700, such as one or more components of communication network 714 or server 702. In still other embodiments, audio stream processor 712 works in conjunction with one or more components of communication network 714 or server 702 to implement certain functionality described herein in a distributed or cooperative manner.

Server 702 includes control circuitry 720 and server interface 722, and control circuitry 720 includes storage 724 and processing circuitry 726. Computing device 718, which may be a personal computer, a laptop computer, a tablet computer, a smartphone, entertainment equipment, or any other type of computing device, includes control circuitry 728, speaker 732, display 734, hardware interface 742, and computing device interface 736. Control circuitry 728 includes storage 738 and processing circuitry 740. Control circuitry 720 and/or 728 may be based on any suitable processing circuitry such as processing circuitry 726 and/or 740. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 720 and/or control circuitry 728 are configured to implement an audio processing system, such as system 100 or system 200, or parts thereof, such as audio stream processor 102 and audio stream processor 202, and/or any plugins thereof, each of which is described above in connection with FIGS. 1, 2, respectively.

In some embodiments, audio stream processor 712 may be configured as audio stream processor 102 or audio stream processor 202, of FIGS. 1 and 2, respectively. In some embodiments where audio stream processor 712 is standalone, audio stream processor 712 may be directly communicatively coupled to computing device 718 and/or server 702. In some embodiments where audio stream processor 712 is standalone, audio stream processor 712 may be indirectly communicatively coupled to computing device 718 and/or server 702, through communication network 714. Similarly, audio stream processor 712 may be directly communicatively coupled to ASR services 744 or indirectly coupled to ASR services 744 through communication network 714. In some embodiments, ASR services 744 is analogous to ASR services 104 of FIG. 1 or ASR services 204 of FIG. 2.

In some embodiments, while not shown in FIG. 7, audio stream processor 712, as a standalone unit, may be configured with similar components as server 702 and/or computing device 718. For example, audio stream processor 712 may have a control circuitry analogous to control circuitry 720, a storage device analogous to storage 724 and a processing circuit analogous to processing circuit 726, and an interface analogous to interface 722. For example, storage 724 and storage 120 (FIG. 1) and/or storage 220 (FIG. 2) may be analogously configured. Processing circuit 726 and audio signal processor 118 (FIG. 1) and/or audio signal processor 218 (FIG. 2) may be analogously configured; and interface 722 and audio stream interface 116 (FIG. 1) and/or audio stream interface 216 (FIG. 2) may be analogously configured. In some embodiments, buffer processor 114 of FIG. 1 may be configured as processing circuit 726 and buffer 122 may be configured as storage 724. In a non-limiting operational example, one or more of the server interface 722, interface of the audio stream processor 712, hardware interface 742, and computing device interace 736 may send N number of audio streams to buffer 122 (FIG. 1).

Each of storage 724, storage 738, and/or storages of other components of system 700 (e.g., storages 120 and 220 and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 724, storage 738, and/or storages of other components of system 700 may be used to store various types of content, metadata, and or other types of data. Non-volatile memory may also be used (e.g., to launch a boot-up routine and other instructions). Cloud-based storage may be used to supplement storages 724, 738 or instead of storages 724, 738. In some embodiments, control circuitry 720 and/or 728 executes instructions for an application stored in memory (e.g., storage 724 and/or 738). Specifically, control circuitry 720 and/or 728 may be instructed by the application to perform the functions discussed herein. In some implementations, any action performed by control circuitry 720 and/or 728 may be based on instructions received from the application. For example, the application may be implemented as software or a set of executable instructions that may be stored in storage 724 and/or 738 and executed by control circuitry 720 and/or 728. In some embodiments, the application may be a client/server application where only a client application resides on computing device 718, and a server application resides on server 702.

The application may be implemented using any suitable architecture. For example, it may be a stand-alone application wholly implemented on computing device 718. In such an approach, instructions for the application are stored locally (e.g., in storage 738), and data for use by the application is downloaded on a periodic basis (e.g., from an out-of-band feed, from an Internet resource, or using another suitable approach). Control circuitry 728 may retrieve instructions for the application from storage 738 and process the instructions to perform the functionality described herein. Based on the processed instructions, control circuitry 728 may determine what action to perform when input is received from interface 736.

In client/server-based embodiments, control circuitry 728 may include communication circuitry suitable for communicating with an application server (e.g., server 702) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 714). In another example of a client/server-based application, control circuitry 728 runs a web browser that interprets web pages provided by a remote server (e.g., server 702). For example, the remote server may store the instructions for the application in a storage device. The remote server may process the stored instructions using circuitry (e.g., control circuitry 720) and/or generate displays. Computing device 718 may receive the displays generated by the remote server and may display the content of the displays locally via display 734. This way, the processing of the instructions is performed remotely (e.g., by server 702) while the resulting displays, such as the display windows described elsewhere herein, are provided locally on computing device 718. Computing device 718 may receive inputs from the user via computing device interface 736 and transmit those inputs to the remote server for processing and generating the corresponding displays.

A user may send instructions to control circuitry 720 and/or 728 using user input interface 736. Interface 736 may be any suitable user interface, such as a remote control, trackball, keypad, keyboard, touchscreen, touchpad, stylus input, joystick, voice recognition interface, a gaming controller, or other user input interfaces. In an embodiment, interface 736 is configured as at least a part of an audio source, such as audio source 108 or audio source 208. Interface 736 may be integrated with or combined with display 734, which may be a monitor, a television, a liquid crystal display (LCD), electronic ink display, or any other equipment suitable for displaying visual images. In an embodiment, display 734 may be a part of an audio source, such as audio source 108 or audio source 208.

Server 702 and computing device 718 may transmit and receive content and data via interfaces 722 and 742. For instance, interface 722 may include a communication port configured to receive audio streams via communication network 714, and/or to communicate payload and text file information to and from ASR services 744. Control circuitry 720, 728 may be used to send and receive commands, requests, and other suitable data using interfaces 722, 742, respectively.

In some embodiments, a part or the entirety of system 700 carries out the steps and determinations of the flowcharts of FIGS. 4-6, in addition to other steps and determinations not shown or discussed herein.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

This specification discloses embodiments which include, but are not limited to, the following:

1. A method of processing audio streams, the method comprising:

receiving N number of audio streams during a time window, each audio stream received from an independent source and including speech content;

generating N−1 number of audio stream separators;

concatenating a set of the audio streams to generate a concatenated audio stream;

inserting an audio stream separator between every two adjacent audio streams of the concatenated audio stream to generate a single audio stream payload, each audio stream separator delineating a beginning of a next audio stream and an end of a preceding audio stream in the concatenated audio stream;

transmitting the single audio stream payload from a buffer for transcription of the speech content of the set of audio streams to text content, a transcription of each of the speech content of the set of audio streams; and in response to transmitting the single audio stream payload for transcription, receiving a text file including the text content delineated with the audio stream separators.

2. The method of item 1, further comprising concatenating the set of the audio streams in the buffer.

3. The method of item 2, further comprising inserting the audio stream separator between every two adjacent audio streams of the concatenated audio stream in the buffer.

4. The method of item 1, wherein a size of the buffer is based on a duration of the time window.

5. The method of item 1, wherein the speech content of each of the audio streams has an associated duration, further wherein a size of the buffer is based on a multiple of a maximum speech content duration among the durations of the speech content of the set of audio streams.

6. The method of item 5, wherein the maximum speech content duration corresponds to a minimum base transcription price.

7. The method of item 5, wherein minimum transcription charges for transcription of the audio streams are based on the maximum speech content duration.

8. The method of item 1, further comprising concatenating the set of the audio streams in a storage.

9. The method of item 8, further comprising inserting the audio stream separator between every two adjacent audio streams of the concatenated audio stream in the storage.

10. The method of item 1, further comprising performing the transmitting the single audio stream payload for transcription no later than an end of a wait time, the wait time starting from a request to onboard the buffer with one or more of the audio streams of the set of audio streams and ending at a subsequent request to re-onboard the buffer with a subsequent set of the N audio streams or a set of audio streams in N+1 audio streams.

11. The method of item 1, wherein performing the transmitting regardless of a density of the buffer to prevent noticeable delay in receiving the text file.

12. The method of item 1, wherein the audio streams have different audio stream sizes and the method further comprising:
  performing the transmitting when the time window ends regardless of the audio stream sizes,
  wherein the single audio stream payload excludes a remaining set of audio streams of one or more of the set of audio streams not received in an entirety.

13. The method of item 12, further comprising transmitting the remaining set of audio streams for transcription in a subsequent single audio stream payload.

14. The method of item 1, further comprising separating each of the text content delineated with the audio stream separators from the text file, wherein each of the text content delineated with the audio stream separators corresponds to at least one of the independent sources.

15. The method of item 1, further comprising:
  in response to the receiving, determining whether at least one of the audio streams requires transaction-based speech-to-text services; and
  in response to determining that at least one of the audio streams does not require transaction-based speech-to-text services, initiating time-based speech-to-text services on the audio streams.

16. The method of item 15, wherein the determining whether at least one of the audio streams requires transaction-based speech-to-text services is based at least in part on an ASR service cost-structure.

17. The method of item 15, wherein the determining whether at least one of the audio streams requires transaction-based speech-to-text services is based at least in part on an average size of the N number of audio streams or an average size of the set of audio streams.

18. The method of item 15, wherein the determining whether at least one of the audio streams requires transaction-based speech-to-text services is based at least in part on a size of the time window associated with the N number of audio streams.

19. A system for processing audio streams comprising:
  an audio stream interface configured to receive N number of audio streams during a time window, each audio stream received from an independent source and including speech content; and
  a processor configured to:
    generate N−1 number of audio stream separators;
    concatenate a set of the audio streams to generate a concatenated audio stream; and
    insert an audio stream separator between every two adjacent audio streams of the concatenated audio stream in the buffer to generate a single audio stream payload, each audio stream separator delineating a beginning of a next audio stream and an end of a preceding audio stream,
  wherein the audio stream interface is further configured to:
    transmit the single audio stream payload from a buffer for transcription of the speech content of the set of audio streams to text content, and
    in response to the transmitted single audio stream payload for transcription, receive a text file including the text content delineated with the audio stream separators.

20. The system of item 19, wherein a buffer processor is configured to concatenate the set of the audio streams in the buffer.

21. The system of item 20, wherein the buffer processor is configured to insert the audio stream separator between every two adjacent audio streams of the concatenated audio stream in the buffer.

22. The system of item 19, wherein a size of the buffer is based on a duration of the time window.

23. The system of item 19, wherein the speech content of each of the audio streams has an associated duration, further wherein a size of the buffer is based on a multiple of a maximum speech content duration among the durations of the speech content of the set of audio streams.

24. The system of item 23, wherein the maximum speech content duration corresponds to a minimum base transcription price.

25. The system of item 23, wherein minimum transcription charges for transcription of the audio streams are based on the maximum speech content duration.

26. The system of item 19, wherein a storage is configured to concatenate the set of the audio streams in a storage.

27. The system of item 26, wherein a buffer processor is configured to insert the audio stream separator between every two adjacent audio streams of the concatenated audio stream in the storage.

28. The system of item 19, wherein the processor is further configured to transmit the single audio stream payload for transcription no later than an end of a wait time, the wait time starting from a request to onboard the buffer with one or more of the audio streams of the set of audio streams and ending at a subsequent request to re-onboard the buffer with another set of audio streams in the N audio streams or a set of audio streams in an N+1 audio streams.

29. The system of item 19, wherein the audio streams are transmitted regardless of a density of the buffer to prevent noticeable delay in receiving the text file.

30. The system of item 19, wherein the audio streams have different audio stream sizes and a buffer processor is configured to transmit the audio streams are transmitted when the time window ends regardless of the audio stream sizes, further wherein the single audio stream payload excludes a remaining set of audio streams of one or more audio streams not received in an entirety.

31. The system of item 30, wherein the processor is further configured to transmit the remaining set of audio streams for transcription in a subsequent single audio stream payload.

32. The system of item 19, wherein the processor is further configured to separate each of the text content delineated with the audio stream separators from the text file, wherein each of the text content delineated with the audio stream separators corresponds to at least one of the independent sources.

33. The system of item 12, wherein the processor is further configured to, prior to transmission of the audio streams, for each audio stream, determine whether at least one of the audio streams requires transaction-based speech-to-text services and in response to determining that at least one of the audio streams does not require transaction-based speech-to-text services, initiating time-based speech-to-text services on the audio streams.

34. The system of item 33, wherein the processor is further configured to determine whether at least one of the audio streams requires transaction-based speech-to-text services is based at least in part on an ASR service cost-structure.

35. The system of item 33, wherein the processor is further configured to determine whether at least one of the audio streams requires transaction-based speech-to-text services is based at least in part on an average size of the N number of audio streams or an average size of the set of audio streams.

36. The system of item 33, wherein the processor is further configured to determine whether at least one of the audio streams requires transaction-based speech-to-text services is based at least in part on a size of the time window associated with the N number of audio streams.

37. A non-transitory computer-readable medium having instructions encoded thereon that when executed by control circuitry cause the control circuitry to:
receive N number of audio streams during a time window, each audio stream received from an independent source and including speech content;
generate N−1 number of audio stream separators;
concatenate a set of the audio streams to generate a concatenated audio stream;
insert an audio stream separator between every two adjacent audio streams of the concatenated audio stream to generate a single audio stream payload, each audio stream separator delineating a beginning of a next audio stream and an end of a preceding audio stream in the concatenated audio stream;
transmit the single audio stream payload from a buffer for transcription of the speech content of the set of audio streams to text content; and
in response to transmitting the single audio stream payload for transcription, receive a text file including the text content delineated with the audio stream separators.

38. The non-transitory computer-readable medium of item 37, further having instructions encoded thereon that when executed by the control circuitry cause the control circuitry to:
concatenate the set of the audio streams in the buffer.

39. The non-transitory computer-readable medium of item 38, further having instructions encoded thereon that when executed by the control circuitry cause the control circuitry to: insert the audio stream separator between every two adjacent audio streams of the concatenated audio stream in the buffer.

40. The non-transitory computer-readable medium of item 37, wherein a size of the buffer is based on a duration of the time window.

41. The non-transitory computer-readable medium of item 37, wherein the speech content of each of the audio streams has an associated duration, further wherein a size of the buffer is based on a multiple of a maximum speech content duration among the durations of the speech content of the set of audio streams.

42. The non-transitory computer-readable medium of item 41, wherein the maximum speech content duration corresponds to a minimum base transcription price.

43. The non-transitory computer-readable medium of item 41, wherein minimum transcription charges for transcription of the audio streams are based on the maximum speech content duration.

44. The non-transitory computer-readable medium of item 37, further having instructions encoded thereon that when executed by the control circuitry cause the control circuitry to:
concatenate the set of the audio streams in a storage.

45. The non-transitory computer-readable medium of item 44, further having instructions encoded thereon that when executed by the control circuitry cause the control circuitry to:
insert the audio stream separator between every two adjacent audio streams of the concatenated audio stream in the storage.

46. The non-transitory computer-readable medium of item 37, further having instructions encoded thereon that when executed by the control circuitry cause the control circuitry to:
perform the transmitting the single audio stream payload for transcription no later than an end of a wait time, the wait time starting from a request to onboard the buffer with one or more of the audio streams of the set of audio streams and ending at a subsequent request to re-onboard the buffer with another set of audio streams in the N audio streams or a set of audio streams in an N+1 audio streams.

47. The non-transitory computer-readable medium of item 37, wherein performing the transmitting regardless of a density of the buffer to prevent noticeable delay in receiving the text file.

48. The non-transitory computer-readable medium of item 37, wherein the audio streams have different audio stream sizes and the non-transitory computer-readable medium further has instructions encoded thereon that when executed by the control circuitry cause the control circuitry to:
perform the transmitting when the time window ends regardless of the audio stream sizes, wherein the single audio stream payload excludes a remaining set of audio streams of one or more audio streams not received in an entirety.

49. The non-transitory computer-readable medium of item 48, further having instructions encoded thereon that when executed by the control circuitry cause the control circuitry to:
  transmit the remaining set of audio streams for transcription in a subsequent single audio stream payload.

50. The non-transitory computer-readable medium of item 37, further having instructions encoded thereon that when executed by the control circuitry cause the control circuitry to:
  separate each of the text content delineated with the audio stream separators from the text file, wherein each of the text content delineated with the audio stream separators corresponds to at least one of the independent sources.

51. The non-transitory computer-readable medium of item 37, further having instructions encoded thereon that when executed by the control circuitry cause the control circuitry to:
  in response to the receiving, determine whether at least one of the audio streams requires transaction-based speech-to-text services; and
  in response to determining that at least one of the audio streams does not require transaction-based speech-to-text services, initiate time-based speech-to-text services on the audio streams.

52. The non-transitory computer-readable medium of item 51, wherein the determining whether at least one of the audio streams requires transaction-based speech-to-text services is based at least in part on an ASR service cost-structure.

53. The non-transitory computer-readable medium of item 51, wherein the determining whether at least one of the audio streams requires transaction-based speech-to-text services is based at least in part on an average size of the N number of audio streams or an average size of the set of audio streams.

54. The non-transitory computer-readable medium of item 51, wherein the determining whether at least one of the audio streams requires transaction-based speech-to-text services is based at least in part on a size of the time window associated with the N number of audio streams.

55. A system for processing audio streams, the system comprising:
  means for receiving N number of audio streams during a time window, each audio stream received from an independent source and including speech content;
  means for generating N−1 number of audio stream separators;
  means for concatenating a set of the audio streams to generate a concatenated audio stream;
  means for inserting an audio stream separator between every two adjacent audio streams of the concatenated audio stream to generate a single audio stream payload, each audio stream separator delineating a beginning of a next audio stream and an end of a preceding audio stream in the concatenated audio stream;
  means for transmitting the single audio stream payload from a buffer for transcription of the speech content of the set of audio streams to text content; and
  means for in response to transmitting the single audio stream payload for transcription, receiving a text file including the text content delineated with the audio stream separators.

56. The system of item 55, further comprising means for concatenating the set of the audio streams in the buffer.

57. The system of item 56, further comprising means for inserting the audio stream separator between every two adjacent audio streams of the concatenated audio stream in the buffer.

58. The system of item 55, wherein a size of the buffer is based on a duration of the time window.

59. The system of item 55, wherein the speech content of each of the audio streams has an associated duration, further wherein a size of the buffer is based on a multiple of a maximum speech content duration among the durations of the speech content of the set of audio streams.

60. The system of item 59, wherein the maximum speech content duration corresponds to a minimum base transcription price.

61. The system of item 59, wherein minimum transcription charges for transcription of the audio streams are based on the maximum speech content duration.

62. The system of item 55, further comprising means for concatenating the set of the audio streams in a storage.

63. The system of item 62, further comprising means for inserting the audio stream separator between every two adjacent audio streams of the concatenated audio stream in the storage.

64. The system of item 55, further comprising means for performing the transmitting the single audio stream payload for transcription no later than an end of a wait time, the wait time starting from a request to onboard the buffer with one or more of the audio streams of the set of audio streams and ending at a subsequent request to re-onboard the buffer with another set of audio streams in the N audio streams or a set of audio streams in an N+1 audio streams.

65. The system of item 55, wherein performing the transmitting regardless of a density of the buffer to prevent noticeable delay in receiving the text file.

66. The system of item 55, wherein the audio streams have different audio stream sizes and the method further comprising:
  means for performing the transmitting when the time window ends regardless of the audio stream sizes,
  wherein the single audio stream payload excludes a remaining set of audio streams of one or more audio streams not received in an entirety.

67. The system of item 66, further comprising means for transmitting the remaining set of audio streams for transcription in a subsequent single audio stream payload.

68. The system of item 55, further comprising means for separating each of the text content delineated with the audio stream separators from the text file, wherein each of the text content delineated with the audio stream separators corresponds to at least one of the independent sources.

69. The system of item 55, further comprising:
  in response to the receiving, means for determining whether at least one of the audio streams requires transaction-based speech-to-text services; and
  in response to determining that at least one of the audio streams does not require transaction-based speech-to-text services, means for initiating time-based speech-to-text services on the audio streams.

70. The system of item 69, wherein the means for determining whether at least one of the audio streams requires transaction-based speech-to-text services is based at least in part on an ASR service cost-structure.

71. The system of item 69, wherein the means for determining whether at least one of the audio streams requires transaction-based speech-to-text services is based at least in part on an average size of the N number of audio streams or an average size of the set of audio streams.

72. The system of item 69, wherein the means for determining whether at least one of the audio streams requires transaction-based speech-to-text services is based at least in part on a size of the time window associated with the N number of audio streams.

73. A method of processing audio streams, the method comprising:
receiving N number of audio streams during a time window, each audio stream received from an independent source and including speech content;
generating N−1 number of audio stream separators;
concatenating a set of the audio streams to generate a concatenated audio stream;
inserting an audio stream separator between every two adjacent audio streams of the concatenated audio stream to generate a single audio stream payload, each audio stream separator delineating a beginning of a next audio stream and an end of a preceding audio stream in the concatenated audio stream;
transmitting the single audio stream payload from a buffer for transcription of the speech content of the set of audio streams to text content; and
in response to transmitting the single audio stream payload for transcription, receiving a text file including the text content delineated with the audio stream separators.

74. The method of item 73, further comprising concatenating the set of the audio streams in the buffer.

75. The method of item 73 or item 74, further comprising inserting the audio stream separator between every two adjacent audio streams of the concatenated audio stream in the buffer.

76. The method of any one of items 73 through 75, wherein a size of the buffer is based on a duration of the time window.

77. The method of any one of items 73 through 76, wherein the speech content of each of the audio streams has an associated duration, further wherein a size of the buffer is based on a multiple of a maximum speech content duration among the durations of the speech content of the set of audio streams.

78. The method of item 77, wherein the maximum speech content duration corresponds to a minimum base transcription price.

79. The method of item 78, wherein minimum transcription charges for transcription of the audio streams are based on the maximum speech content duration.

80. The method of any one of items 73 through 79, further comprising concatenating the set of the audio streams in a storage.

81. The method of item 80, further comprising inserting the audio stream separator between every two adjacent audio streams of the concatenated audio stream in the storage.

82. The method of any one of items 73 through 81, further comprising performing the transmitting the single audio stream payload for transcription no later than an end of a wait time, the wait time starting from a request to onboard the buffer with one or more of the audio streams of the set of audio streams and ending at a subsequent request to re-onboard the buffer with another set of audio streams in the N audio streams or a set of audio streams in an N+1 audio streams.

83. The method of any one of items 73 through 82, wherein performing the transmitting regardless of a density of the buffer to prevent noticeable delay in receiving the text file.

84. The method of any one of items 73 through 83, wherein the audio streams have different audio stream sizes and the method further comprising:
performing the transmitting when the time window ends regardless of the audio stream sizes,
wherein the single audio stream payload excludes a remaining set of audio streams of one or more audio streams not received in an entirety.

85. The method of item 84, further comprising transmitting the remaining set of audio streams for transcription in a subsequent single audio stream payload.

86. The method of any one of items 73 through 85, further comprising separating each of the text content delineated with the audio stream separators from the text file, wherein each of the text content delineated with the audio stream separators corresponds to at least one of the independent sources.

87. The method of any one of items 73 through 86, further comprising:
in response to the receiving, determining whether at least one of the audio streams requires transaction-based speech-to-text services; and
in response to determining that at least one of the audio streams does not require transaction-based speech-to-text services, initiating time-based speech-to-text services on the audio streams.

88. The method of item 87, wherein the determining whether at least one of the audio streams requires transaction-based speech-to-text services is based at least in part on an ASR service cost-structure.

89. The method of item 87, wherein the determining whether at least one of the audio streams requires transaction-based speech-to-text services is based at least in part on an average size of the N number of audio streams or an average size of the set of audio streams.

90. The method of item 87, wherein the determining whether at least one of the audio streams requires transaction-based speech-to-text services is based at least in part on a size of the time window associated with the N number of audio streams.

What is claimed is:
1. A method of processing audio streams, the method comprising:
receiving a plurality of audio streams during a time window, each audio stream received from an independent source, including speech content, and having an audio stream duration;
selecting a subset of the plurality of audio streams based on the respective audio stream durations of the plurality of audio streams, the subset comprising N number of audio streams, wherein a combined duration of the N number of audio streams is below a threshold duration, and wherein the threshold duration is based on a transaction cost for speech-to-text conversion;
generating N−1 number of audio stream separators;
concatenating the N number of audio streams to generate a concatenated audio stream;
inserting an audio stream separator between every two adjacent audio streams of the concatenated audio stream to generate a single audio stream payload, each audio stream separator delineating a beginning of a next audio stream and an end of a preceding audio stream in the concatenated audio stream;
transmitting the single audio stream payload from a buffer for transcription of the speech content of the set of audio streams to text content, a transcription of each of the speech content of the set of audio streams; and in response to transmitting the single audio stream payload for transcription, receiving a text file including the text content delineated with the audio stream separators.

2. The method of claim 1, further comprising concatenating the N number of audio streams in the buffer.

3. The method of claim 2, further comprising inserting the audio stream separator between every two adjacent audio streams of the concatenated audio stream in the buffer.

4. The method of claim 1, wherein a size of the buffer is based on a multiple of a maximum speech content duration among the durations of the speech content of the N number of audio streams.

5. The method of claim 4, wherein the maximum speech content duration corresponds to a minimum base transcription price.

6. The method of claim 4, wherein minimum transcription charges for transcription of the audio streams are based on the maximum speech content duration.

7. The method of claim 1, further comprising concatenating the N number of audio streams in a storage.

8. The method of claim 7, further comprising inserting the audio stream separator between every two adjacent audio streams of the concatenated audio stream in the storage.

9. The method of claim 1, wherein a size of the buffer is based on a duration of the time window.

10. The method of claim 1, further comprising performing the transmitting the single audio stream payload from a buffer for transcription no later than an end of a wait time, the wait time starting from a request to onboard the buffer with one or more of the audio streams of the audio stream payload and ending at a subsequent request to re-onboard the buffer with a subsequent set of the plurality of audio streams.

11. The method of claim 1, wherein performing the transmitting regardless of a density of the buffer to prevent noticeable delay in receiving the text file.

12. A system for processing audio streams, the system comprising: input/output (I/O) circuitry configured to:
receive a plurality of audio streams during a time window, each audio stream received from an independent source, including speech content, and having an audio stream duration; and
control circuitry configured to:
select a subset of the plurality of audio streams based on the respective audio stream durations of the plurality of audio streams, the subset comprising N number of audio streams, wherein a combined duration of the N number of audio streams is below a threshold duration, and wherein the threshold duration is based on a transaction cost for speech-to-text conversion;
generate N−1 number of audio stream separators;
concatenate the N number of audio streams to generate a concatenated audio stream;
insert an audio stream separator between every two adjacent audio streams of the concatenated audio stream to generate a single audio stream payload, each audio stream separator delineating a beginning of a next audio stream and an end of a preceding audio stream in the concatenated audio stream;
transmit the single audio stream payload from a buffer for transcription of the speech content of the set of audio streams to text content, a transcription of each of the speech content of the set of audio streams; and
in response to transmitting the single audio stream payload for transcription, receive a text file including the text content delineated with the audio stream separators.

13. The system of claim 12, wherein:
a size of the buffer is based on a multiple of a maximum speech content duration among the durations of the speech content of the N number of audio streams.

14. The system of claim 13, wherein the maximum speech content duration corresponds to a minimum base transcription price.

15. The system of claim 13, wherein minimum transcription charges for transcription of the audio streams are based on the maximum speech content duration.

16. The system of claim 12, wherein the control circuitry is further configured to:
concatenating the N number of audio streams in the buffer; and
inserting the audio stream separator between every two adjacent audio streams of the concatenated audio stream in the buffer.

17. The system of claim 12, wherein a size of the buffer is based on a duration of the time window.

18. The system of claim 12, wherein the control circuitry is further configured to:
concatenate the N number of audio streams in a storage; and
insert the audio stream separator between every two adjacent audio streams of the concatenated audio stream in the storage.

19. The system of claim 12, wherein the control circuitry is further configured to perform the transmitting the single audio stream payload from a buffer for transcription no later than an end of a wait time, the wait time starting from a request to onboard the buffer with one or more of the audio streams of the audio stream payload and ending at a subsequent request to re-onboard the buffer with a subsequent set of the plurality of audio streams.

20. The system of claim 12, wherein the control circuitry is further configured to perform the transmitting regardless of a density of the buffer to prevent noticeable delay in receiving the text file.

\* \* \* \* \*